United States Patent
Nam et al.

(10) Patent No.: US 10,834,343 B2
(45) Date of Patent: Nov. 10, 2020

(54) IMAGE SENSOR INCLUDING COLOR SPLITTING ELEMENT AND METHOD OF OPERATING THE IMAGE SENSOR

(71) Applicant: SAMSUNG ELECTRONICS CO., LTD., Suwon-si (KR)

(72) Inventors: Sunghyun Nam, Yongin-si (KR); Sookyoung Roh, Seoul (KR); Seokho Yun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 15/807,053

(22) Filed: Nov. 8, 2017

(65) Prior Publication Data

US 2018/0131882 A1 May 10, 2018

(30) Foreign Application Priority Data

Nov. 8, 2016 (KR) ........................ 10-2016-0148182

(51) Int. Cl.
| | |
|---|---|
| *H04N 5/355* | (2011.01) |
| *G01J 1/44* | (2006.01) |
| *H04N 5/369* | (2011.01) |
| *G01J 1/04* | (2006.01) |
| *H04N 9/07* | (2006.01) |
| *H04N 5/235* | (2006.01) |

(52) U.S. Cl.
CPC ............ *H04N 5/355* (2013.01); *G01J 1/0437* (2013.01); *G01J 1/0477* (2013.01); *G01J 1/44* (2013.01); *H04N 5/2351* (2013.01); *H04N 5/369* (2013.01); *H04N 5/3696* (2013.01); *H04N 9/07* (2013.01)

(58) Field of Classification Search
CPC ...... H04N 5/355; H04N 5/369; H04N 5/2351; H04N 5/3696; H04N 9/07; H04N 5/2254; H04N 5/335; G01J 1/44; G01J 1/0477; G01J 1/0437; H01L 27/146; G02B 5/208
USPC ........................................................ 250/208.1
See application file for complete search history.

(56) References Cited

U.S. PATENT DOCUMENTS

| | | | |
|---|---|---|---|
| 7,863,633 B2 | 1/2011 | Kato | |
| 10,313,643 B2* | 6/2019 | Fan | ......................... H04N 9/097 |
| 2002/0135825 A1* | 9/2002 | Lee | ....................... G02B 5/1814 |
| | | | 358/509 |
| 2014/0293042 A1* | 10/2014 | Lynam | ....................... B60R 1/00 |
| | | | 348/118 |
| 2016/0006995 A1 | 1/2016 | Yun et al. | |
| 2016/0054172 A1* | 2/2016 | Roh | .................. H01L 27/14621 |
| | | | 250/208.2 |
| 2016/0109716 A1* | 4/2016 | Sohn | ..................... G02B 27/123 |
| | | | 359/639 |

(Continued)

FOREIGN PATENT DOCUMENTS

JP 4410071 B2 2/2010

*Primary Examiner* — Seung C Sohn

(74) *Attorney, Agent, or Firm* — Sughrue Mion, PLLC

(57) ABSTRACT

An image sensor including a color splitting element and a method of operating the image sensor are provided. The image sensor may include a plurality of unit pixels, and each pixel of the plurality of unit pixels may include a plurality of color sub-pixels. At least one color sub-pixel of the plurality of color sub-pixels may include a color splitting element that has a first refractive index greater than a second refractive index of a material that surrounds the first color splitting element.

11 Claims, 12 Drawing Sheets

(56) References Cited

U.S. PATENT DOCUMENTS

2016/0118428 A1    4/2016  Tsau
2016/0118430 A1*  4/2016  Nam et al.
2017/0090206 A1*  3/2017  Kim .................. G02B 27/1013
2017/0133420 A1*  5/2017  Silsby ............... H01L 27/14634

* cited by examiner

FIG. 8

| R | B | R | B | R |
|---|---|---|---|---|
|   |   |   |   |   |
| R | B | R | B | R |
|   |   |   |   |   |
| R | B | R | B | R |

FIG. 9

| R | B (94B) | R (92A) | B (94A) | R (92E) |
|---|---|---|---|---|
|   | (C1) | (C2) | (C3) | (C7) |
| R (92B) | B (94C) | R (92) | B (94) | R (92C) |
|   | (C4) | (C5) | (C6) | (C8) |
| R | B (94D) | R (92D) | B (94E) | R (92F) |

FIG. 13A

| R | G |
|---|---|
| G | B |

FIG. 13B

| R | C |
|---|---|
| C | C |

FIG. 13C

| R | B |
|---|---|
| C | C |

IMAGE SENSOR INCLUDING COLOR SPLITTING ELEMENT AND METHOD OF OPERATING THE IMAGE SENSOR

CROSS-REFERENCE TO RELATED APPLICATION

This application claims priority from Korean Patent Application No. 10-2016-0148182, filed on Nov. 8, 2016 in the Korean Intellectual Property Office, the disclosure of which is incorporated herein by reference in its entirety.

BACKGROUND

1. Field

Apparatuses and methods consistent with exemplary embodiments relate to image sensors, and more particularly, to image sensors including a color splitting element and methods of operating the image sensor.

2. Description of the Related Art

An image sensor may be mounted on an apparatus or vehicle such as a motor vehicle and used to assist sight of a driver. Also, an image sensor may be used for recognizing and determining surrounding situations for safely driving a vehicle. For example, an image sensor may be used for monitoring and recording driving conditions, and also used in parking assistance or an advanced driver assistance system (ADAS).

An image sensor mainly used for these purposes includes a monochrome sensor and a sensor having a red-clear pixel structure (hereinafter, a red-clear sensor). The monochrome sensor does not include a color filter. The red-clear sensor is manufactured by adding red-color information to the monochrome sensor. The red-clear sensor may be used for recognizing traffic lights or a rear side of a vehicle.

SUMMARY

One or more exemplary embodiments provide image sensors including a color splitting structure configured to increase a recognition rate of an object even in a low luminance environment.

Further, one or more exemplary embodiments provide methods of operating the image sensor.

According to an aspect of an exemplary embodiment, there is provided an image sensor including: a plurality of unit pixels, wherein each pixel of the plurality of unit pixels may include a plurality of color sub-pixels, and at least one color sub-pixel of the plurality of color sub-pixels may include a color splitting element that has a first refractive index greater than a second refractive index of a material that surrounds the first color splitting element.

Each pixel of the plurality of unit pixels may further include one or more clear sub-pixels.

The plurality of color sub-pixels may include a red sub-pixel and a blue sub-pixel, and one of the red sub-pixel and the blue sub-pixel may include the color splitting element.

Each pixel of the plurality of unit pixels may include four sub-pixels, and the four sub-pixels may include two first color sub-pixels and two second color sub-pixels.

The image sensor may further include a visible light blocking filter.

The first and the second color sub-pixels may have a relatively high optical absorption rate with respect to light in an infrared wavelength band, compared to light having a wavelength outside the infrared wavelength band.

The first color sub-pixels may absorb an infrared ray in a first wavelength band, and the second color sub-pixels may absorb an infrared ray in a second wavelength band that is greater than the first wavelength band.

The color splitting element may correspond to a first splitting element, and another color sub-pixel of the plurality of color sub-pixels may include a second color splitting element.

The at least one color sub-pixel may include two color splitting elements including the color splitting element.

The color splitting element may be buried in the material having the second refractive index.

According to an aspect of another exemplary embodiment, a method of operating an image sensor is provided. The image sensor may include a plurality of unit pixels, wherein each pixel of the plurality of unit pixels may include a plurality of color sub-pixels, and one of the plurality of color sub-pixels may include a color splitting element. The method may include: calculating brightness with respect to a first sub-pixel included in each pixel of the plurality of unit pixels; and obtaining an image based on the calculated brightness.

Each pixel of the plurality of unit pixels may include one or more clear sub-pixels. The calculating of the brightness may include: calculating an average value of brightness of the clear sub-pixels disposed around the first sub-pixel; and obtaining the calculated average value of brightness as a brightness value of the first sub-pixel. The first sub-pixel may be a color sub-pixel of the plurality of color sub-pixels.

The first sub-pixel may be a red sub-pixel or a blue sub-pixel.

Each of the plurality of unit pixels may include two clear sub-pixels and the first sub-pixel may be a color sub-pixel. A brightness value of the first sub-pixel may be calculated based on the following formula:

the brightness value of first sub-pixel=$A1 \times a + A2 \times b + A3 \times c$.

where, A1 is an average brightness value of clear sub-pixels around the first sub-pixel, A2 is a self-brightness value of the first sub-pixel, A3 is brightness values of other first sub-pixels around the first sub-pixel, and a, b, and c satisfy $a+b+c=1$ The first sub-pixel may be a red sub-pixel or a blue sub-pixel.

According to an aspect of another exemplary embodiment, there is provided a method of operating an image sensor including a plurality of unit pixels, wherein each of the plurality of unit pixels may include: a first color sub-pixel configured to absorb a first light component; a second color sub-pixel configured to absorb a second light component; and two clear sub-pixels, and wherein one of the first color sub-pixel and the second color sub-pixel may include a first color splitting element. The method may include: obtaining a value of the second light component at the first color sub-pixel and a value of the first light component at the second color sub-pixel; and obtaining a value of the second light component or a value of the first light component at each of the clear sub-pixels.

The obtaining the value of the second light component at the first color sub-pixel and the value of the first light component at the second color sub-pixel may include: performing a first interpolation with respect to values of second light components of a plurality of second color sub-pixels adjacent to the first color sub-pixel around the first color sub-pixel to obtain the value of the second light component at the first color sub-pixel, and performing a second interpolation with respect to values of first light components of a plurality of first color sub-pixels adjacent to the second color sub-pixel around the second color sub-pixel to obtain the value of the first light component at the second color sub-pixel.

The obtaining the second light component or the first light component at each of the clear sub-pixels may include: performing a first interpolation with respect to values of second light components of a plurality of second color sub-pixels adjacent to each of the clear sub-pixels around each of the clear sub-pixels to obtain the value of the second light component of each of the clear sub-pixel; and performing a second interpolation with respect to values of first light components of a plurality of first color sub-pixels adjacent to each of the clear sub-pixel around each of the clear sub-pixels to obtain the value of the first light component of each of the clear sub-pixels.

The first light component may be red light and the second light component may be blue light.

BRIEF DESCRIPTION OF THE DRAWINGS

The above and/or other aspects will be more apparent by describing certain exemplary embodiments, with reference to the accompanying drawings, in which:

FIG. 8 is a plan view symbolically showing an image measured by using an image sensor when a unit pixel of the image sensor including a color splitting element according to an exemplary embodiment has an RBCC structure;

FIG. 9 is a plan view showing an example of a pixel configuration of an image sensor used for obtaining brightness and color images when the image sensor including a color splitting element according to an exemplary embodiment is an RBCC sensor;

FIGS. 13A, 13B, 13C, and 13D show a plan view and a graph showing various example unit pixels and optical efficiencies according to each of the unit pixels of an image sensor according to an exemplary embodiment and an image sensor of the related art.

DETAILED DESCRIPTION

Figure 1:
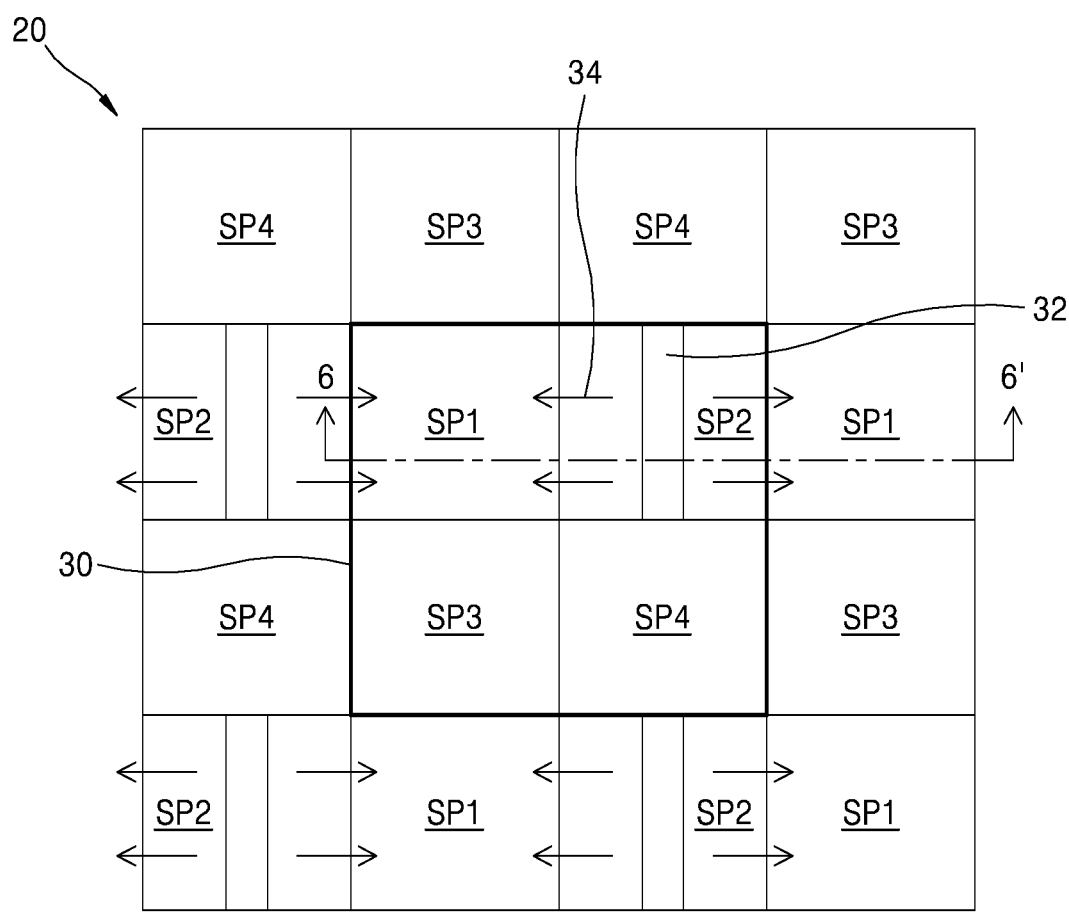
FIG. 1 is a plan view of an image sensor including a color splitting element according to an exemplary embodiment.

Hereinafter, image sensors including a color splitting element according to an exemplary embodiment and methods of operating the same will be described with reference accompanying drawings where exemplary embodiment examples are illustrated. In the drawings, thicknesses of layers and regions may be exaggerated for clarity of the specification.

First, an image sensor including a color splitting element according to an exemplary embodiment will be described.

FIG. 1 is a plan view of an image sensor according to an exemplary embodiment. The image sensor 20 may include a color splitting element 32 according to an exemplary embodiment.

Referring to FIG. 1, the image sensor 20 may include sixteen sub-pixels for convenience of explanation. However, the image sensor 20 may include a larger number of sub-pixels, or may include a smaller number of sub-pixels.

Referring to FIG. 1, a unit pixel 30 may include four sub-pixels SP1 through SP4. The first sub-pixel SP1 may mainly absorb light in a first wavelength band. For example, the first sub-pixel SP1 may mainly absorb red light. The first wavelength band may be in an infrared region. The second sub-pixel SP2 may be located on a right side of the first sub-pixel SP1. The second sub-pixel SP2 may mainly absorb light in a second wavelength band. For example, the second sub-pixel SP2 may mainly absorb blue light. The second sub-pixel SP2 may absorb light in a wavelength band of an infrared region. The wavelength band of the second wavelength band may be different from the first wavelength band. For example, when the infrared region of the first wavelength band is a first band, the second wavelength band may include a second band of the infrared region that is different from the first band. Accordingly, when an image sensor is an infrared image sensor, the first sub-pixel SP1 of the unit pixel 30 may mainly absorb light of the first band of the infrared region, for example, light of a near-infrared region. Also, the second sub-pixel SP2 may mainly absorb light of the second band of the infrared region, for example, light of a far-infrared region. The third sub-pixel SP3 may be located on a lower side of the first sub-pixel SP1 on a plane view. The third sub-pixel SP3 may be referred to as a clear region or a clear sub-pixel as a region that absorbs white light. In a plane view, the fourth sub-pixel SP4 may be located on a right side of the third sub-pixel SP3, that is, on a lower side of the second sub-pixel SP2. The fourth sub-pixel SP4 may be a clear pixel or a region that absorbs white light. The fourth sub-pixel SP4 may also be referred to as a clear sub-pixel.

According to another exemplary embodiment, the third sub-pixel SP3 may absorb one of the first wavelength band or the second wavelength band. The fourth sub-pixel SP4 may absorb the other one of the first wavelength band or the second wavelength band. For example, the third sub-pixel SP3 may absorb the same wavelength band as the second sub-pixel SP2, and the fourth sub-pixel SP4 may absorb the same wavelength band as the first sub-pixel SP1.

Also, according to another exemplary embodiment, the first and second sub-pixels SP1 and SP2 may absorb the same wavelength band. Also, the third and fourth sub-pixels SP3 and SP4 may absorb the same wavelength band. For example, the second sub-pixel SP2 may absorb the same wavelength band as the first sub-pixel SP1. Also, the third and fourth sub-pixels SP3 and SP4 may absorb the same wavelength band as the second sub-pixel SP2.

Figure 2:
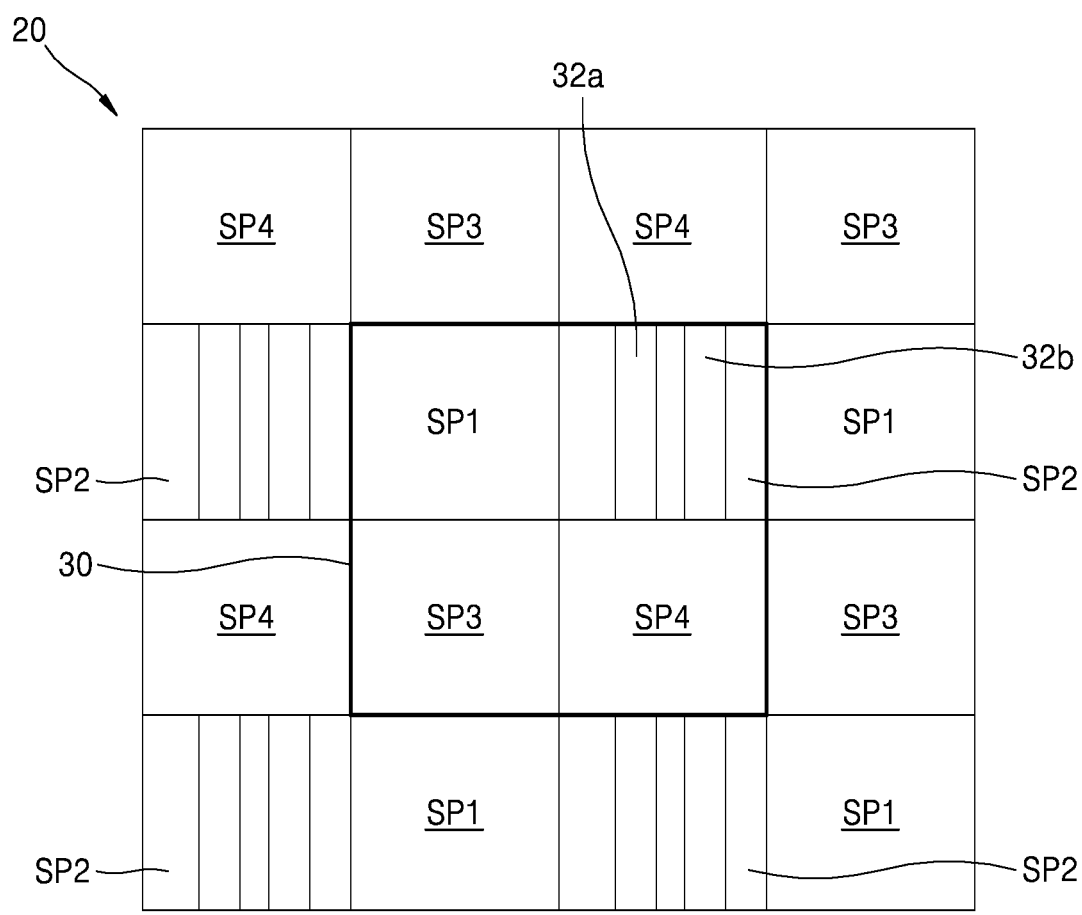
FIG. 2 is a plan view of a pixel region of an image sensor including a color splitting element according to another exemplary embodiment.

The color splitting element 32 is disposed in the second sub-pixel SP2. As depicted in FIG. 1, the color splitting element 32 may be disposed in the center of the second sub-pixel SP2, but may be disposed on a right side or a left side of a region of the second sub-pixel SP2. As depicted in FIG. 2, the color splitting element 32 may be disposed on an upper side of the second sub-pixel SP2. Light incident onto the second sub-pixel SP2 may refract in different directions according to a wavelength thereof due to optical characteristics (e.g., a refractive characteristics) of the color splitting element 32. The optical characteristics of the color splitting element 32 may be controlled by a location, a size, and a material of the color splitting element 32. Accordingly, a specific component of components of light incident to the second sub-pixel SP2, for example, red light 34 may be refracted to the first sub-pixel SP1 adjacent to the second sub-pixel SP2 by the color splitting element 32. Accordingly, the intensity of the specific light component, for example, the red light 34 incident to the first sub-pixel SP1 may be increased greater than when there is no color splitting element 32. In this manner, since a specific component of the components included in light incident to the second sub-pixel SP2 is refracted to the first sub-pixel SP1 adjacent to the second sub-pixel SP2, a color purity of another specific component, for example, blue light incident to the second sub-pixel SP2 is increased greater than when there is no color splitting element 32. As a result, since the color splitting element 32 is provided, intensities required in each of the first and second sub-pixels SP1 and SP2 may be increased, and optical purity of light incident to each of the first and second sub-pixels SP1 and SP2 may also be increased. Therefore, the recognition rate of an object in an environment that has a low luminance may be increased, and color information may also be obtained.

Figure 3:
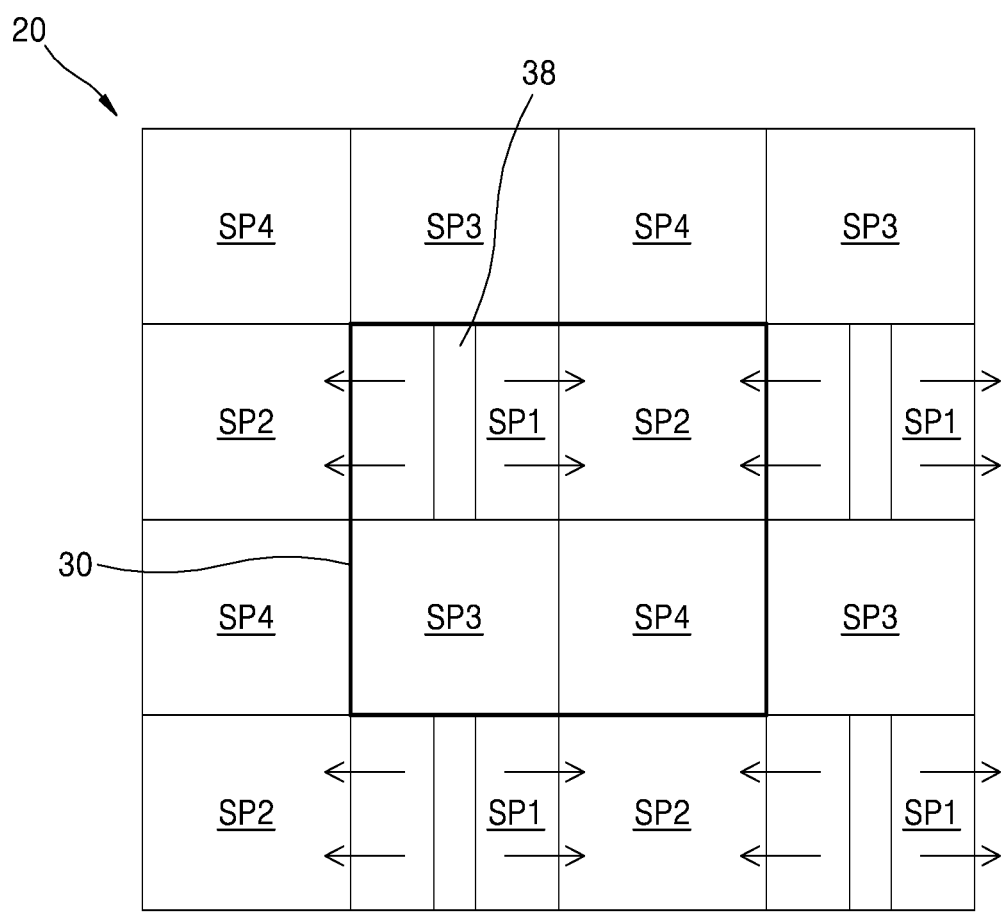
FIGS. 3 through 5 are plan views of a pixel region of an image sensor including a color splitting element according to another exemplary embodiment.

According to FIG. 1, one color splitting element 32 is disposed in the second sub-pixel SP2. However, as depicted in FIG. 2, more than two color splitting elements 32a and 32b may be disposed in the second sub-pixel SP2. Also, as depicted in FIG. 3, a color splitting element 38 may be disposed in the first sub-pixel SP1. Due to the color splitting element 38, a specific component of light incident to the first sub-pixel SP1, for example, blue light, may be refracted and may enter the second sub-pixel SP2. More than two color splitting elements 38 may be disposed in the first sub-pixel SP1.

Figure 4:
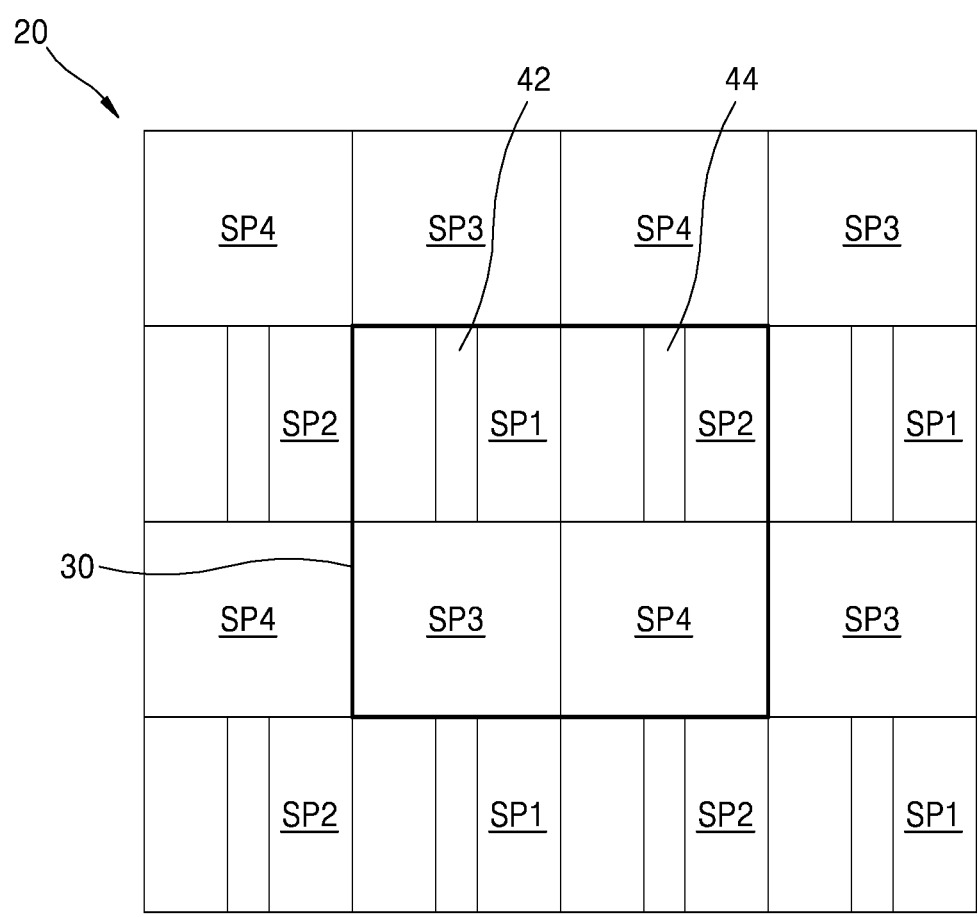

FIG. 4 is a plan view of a pixel region of an image sensor including according to another exemplary embodiment. Referring to FIG. 4, a first color splitting element 42 is disposed in the first sub-pixel SP1, and a second color splitting element 44 is disposed in the second sub-pixel SP2. A plurality of color splitting elements may be disposed in each of the first and second sub-pixels SP1 and SP2.

Figure 5:
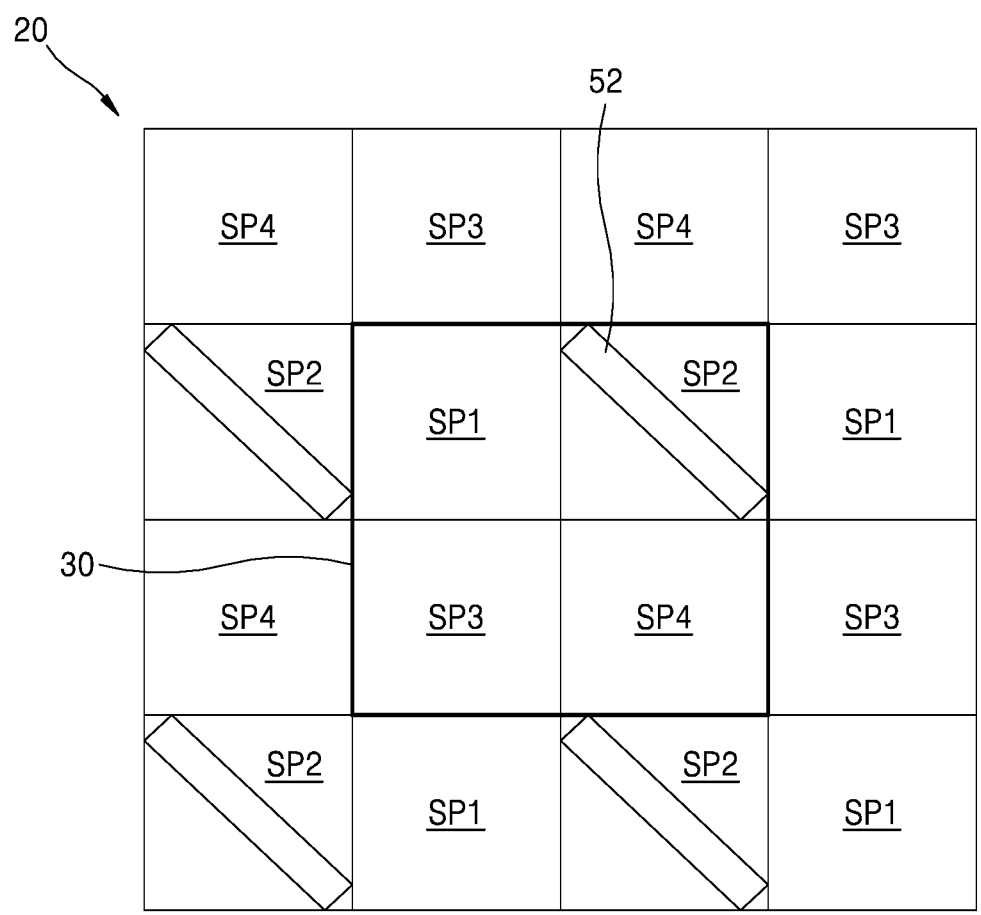

According to FIGS. 1 through 4, the color splitting elements 32, 32a, 32b, 42, and 44 are vertically disposed. However, the color splitting elements 32, 32a, 32b, 42, and 44 may be disposed in different ways. As an example, as depicted in FIG. 5, a color splitting element 52 may be disposed in a diagonal direction in the second sub-pixel SP2. The modified arrangement of the color splitting element 52 may also be applied to the image sensors 20 of FIGS. 2 through 4.

Figure 6:
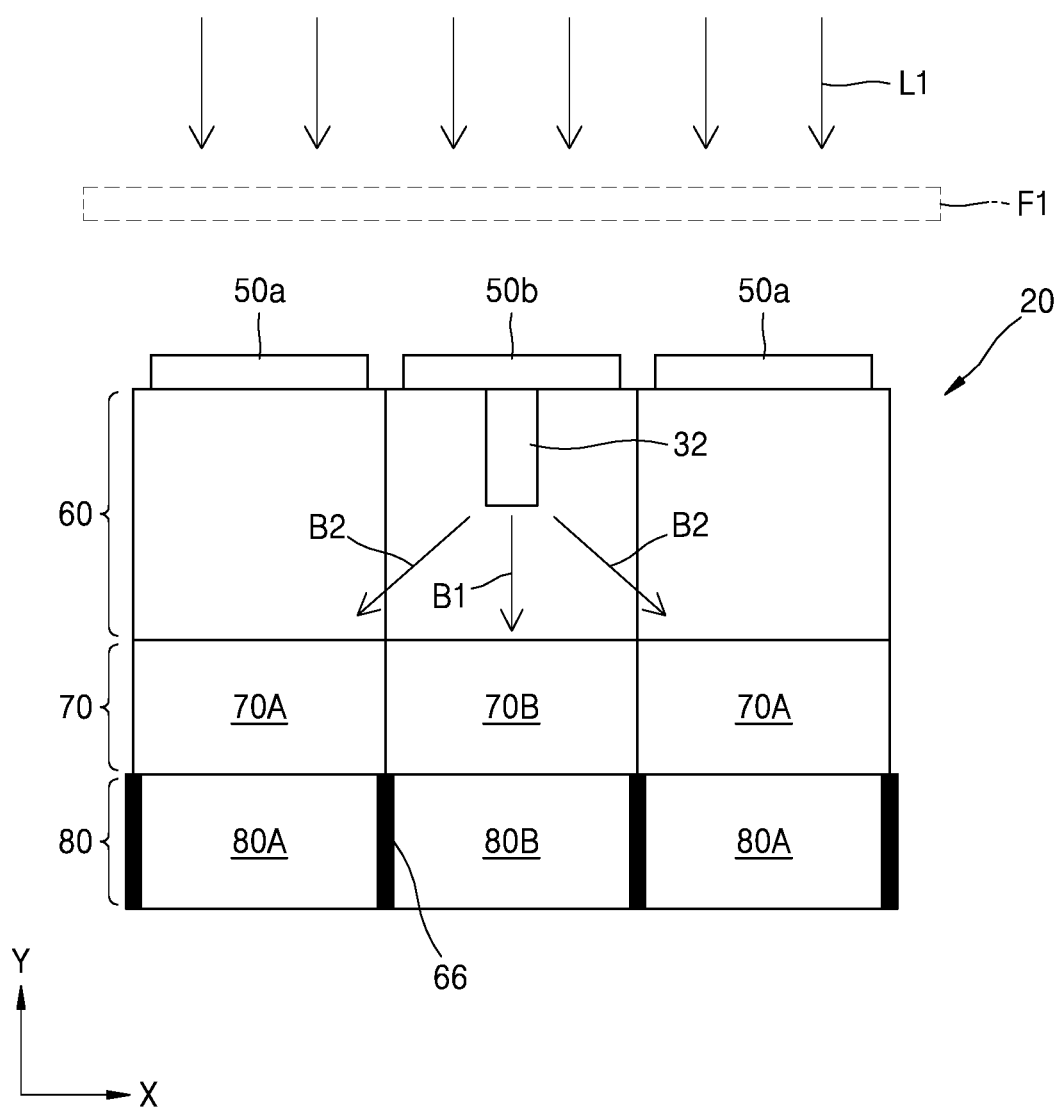
FIG. 6 is a cross-sectional view taken along the line 6-6' of FIG. 1 according to an exemplary embodiment.

FIG. 6 is a cross-sectional view taken along the line 6-6' of FIG. 1 according to an exemplary embodiment.

Referring to FIG. 6, the image sensor 20 may include a photoelectric conversion layer 80, a color filter layer 70, and a low refractive index layer 60 which are sequentially stacked. The photoelectric conversion layer 80 may include a first photoelectric conversion region 80A corresponding to the first sub-pixel SP1 and a second photoelectric conversion region 80B corresponding to the second sub-pixel SP2. The first and second photoelectric conversion regions 80A and 80B respectively may include a photoelectric conversion device, for example, a photodiode. A sub-pixel separation structure 66 (or sub-pixel separation layer) may be arranged between the first and second photoelectric conversion regions 80A and 80B. The photoelectric conversion layer 80 converts light incident to the first and second photoelectric conversion regions 80A and 80B into a current. The current converted from light includes image information. The current is transmitted to a signal processing circuit unit connected to the photoelectric conversion layer 80.

The color filter layer 70 includes a first color filter region 70A corresponding to the first sub-pixel SP1 and a second color filter region 70B corresponding to the second sub-pixel SP2. The first color filter region 70A and the second color filter region 70B of the color filter layer 70 respectively may be located on the first and second photoelectric conversion regions 80A and 80B of the photoelectric conversion layer 80. The color filter layer 70 passes light corresponding to R (red), G (green), and B (blue) to corresponding regions of the photoelectric conversion layer 80. The first color filter region 70A of the color filter layer 70 may pass a specific component of incident light L1, for example, red light to the first photoelectric conversion region 80A of the photoelectric conversion layer 80. The second color filter region 70B of the color filter layer 70 may pass another specific component of incident light L1, for example, blue light to the second photoelectric conversion region 80B of the photoelectric conversion layer 80.

The low refractive index layer 60 may include the color splitting element 32. The color splitting element 32 may be an optical splitter. The color splitting element 32 may be downwardly formed from an upper surface of the low refractive index layer 60. That is, the color splitting element 32 may be formed with a given length from the upper surface of the low refractive index layer 60 towards the color filter layer 70. The color splitting element 32 may be perpendicularly disposed to the upper surface of the low refractive index layer 60. The color splitting element 32 may be parallel to a Y-axis. The color splitting element 32 is spaced apart from the color filter layer 70. The color splitting element 32 is located on the second color filter region 70B of the color filter layer 70.

Optical characteristics and dimensions (e.g., refractive index, width, and length etc.) of the color splitting element 32 may vary according to light (wavelengths) to be split from white light of the incident light L1. The refractive index of the color splitting element 32 may be greater than that of the low refractive index layer 60. The color splitting element 32 may be formed to have optical characteristics and dimensions to make a split action, that is, a refraction action with respect to a specific light component, for example, blue light of the incident light L1, but not to make a split action with respect to another specific component of the incident light L1, for example, red light. The split action is caused by a phase difference of light at the inside and outside of the color splitting element 32 due to the refractive index difference between the color splitting element 32 and the low refractive index layer 60. The phase difference may be affected by the optical characteristics and dimensions of the color splitting element 32. Accordingly, a first light component B1, for example, blue light of the incident light L1 entering a region of the low refractive index layer 60 that corresponds to the second color filter region 70B of the color filter layer 70, may also enter the second color filter region 70B of the color filter layer 70 as it is by properly setting the optical characteristics and dimensions of the color splitting element 32 for a specific purpose. However, a second light component, for example, red light included in the incident light L1, is split or refracted in a diagonal direction of the second color filter region 70B of the color filter layer 70. Accordingly, the second specific light component, for example, red light that is split from the incident light L1 due to the split action of the color splitting element 32, enters a region corresponding to the first sub-pixel SP1, that is, the first color filter region 70A of the color filter layer 70 adjacent to the second color filter region 70B in a diagonal direction. As a result, the first light component B1, for example, blue light of the incident light L1, enters the second color filter region 70B of the color filter layer 70 as it is after passing through the color splitting element 44. Accordingly, a purity of light, that is, a color purity of light incident onto the second color filter region 70B of the color filter layer 70, may be increased. Accordingly, light of high color purity may enter the second photoelectric conversion region 80B. Also, the second light component B2, for example, red light of the incident light L1, enters the first color filter region 70A due to the split action of the color splitting element 32, and thus, an intensity of the second light component B2 entering a first color filter region 70A may be increased to be greater than a case wherein the color splitting element 32 is not used. Accordingly, the second light component incident to the first photoelectric conversion region 80A may also be increased. As a result, when the image sensor 20 according to an exemplary embodiment is used, visibility of an object may be increased even in a low luminance environment.

The low refractive index layer 60 may include a silicon oxide layer, for example, a $SiO_2$ layer or a polymer layer, but is not limited thereto.

First and second lens layers 50a and 50b may be disposed on the low refractive index layer 60. The first and second lens layers 50a and 50b focus incident light L1 to a specific element therebelow. The specific element may be the color splitting element 32 below the second lens layer 50b. If there is no color splitting element below the first lens layer 50a, the first lens layer 50a may be omitted. The second lens layer 50b covers the color splitting element 32. The first and second lens layers 50a and 50b may be micro lenses or etched lenses. The first and second lens layers 50a and 50b are spaced apart from each other. The first lens layer 50a is located on the first color filter region 70A of the color filter layer 70. The second lens layer 50b is located on the second color filter region 70B of the color filter layer 70.

When the image sensor 20 according to an exemplary embodiment is used as an infrared sensor which will be described with reference to FIGS. 10 through 12, a visible light blocking filter F1 may further be disposed above the low refractive index layer 60, for example, above the first and second lens layers 50a and 50b.

Figure 7:
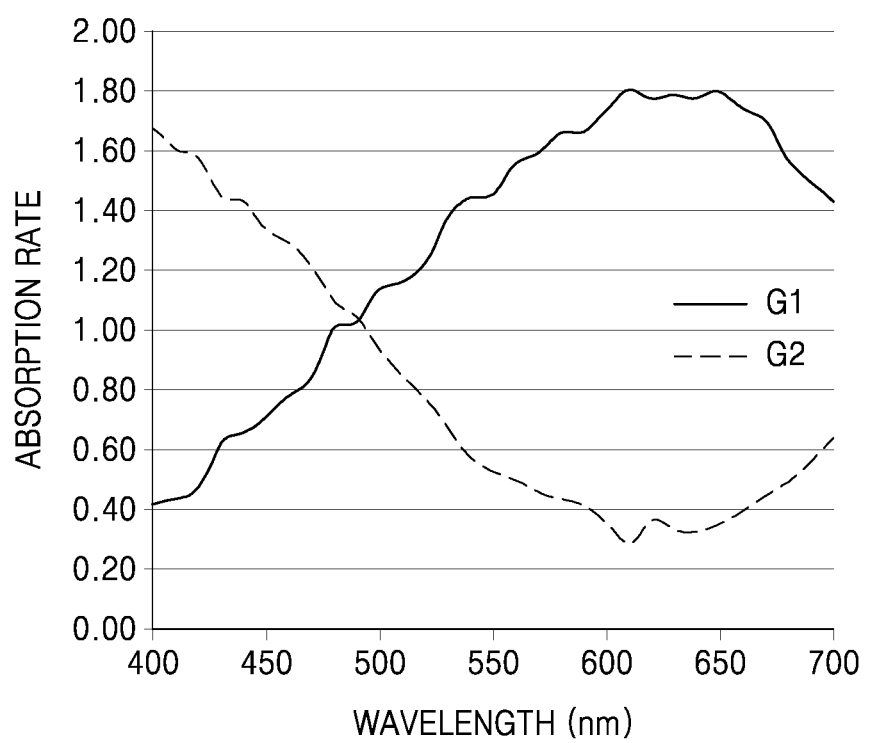
FIG. 7 is a graph showing an optical absorption spectrum of an image sensor including a color splitting element according to an exemplary embodiment.

FIG. 7 is a graph showing an optical absorption spectrum of an image sensor including a color splitting element according to an exemplary embodiment. The result is obtained when the first sub-pixel SP1 is a sub-pixel that absorbs red light, the second sub-pixel SP2 is a sub-pixel that absorbs blue light, and, as depicted in FIG. 1, the color splitting element 32 is disposed on the second sub-pixel SP2.

In FIG. 7, a horizontal axis indicates a wavelength and a vertical axis indicates an optical absorption rate.

In FIG. 7, a first graph G1 shows an optical absorption rate measured at the first sub-pixel SP1, and a second graph G2 shows an optical absorption rate measured at the second sub-pixel SP2.

Referring to first and second graphs G1 and G2, it is seen that red light and blue light of incident light are split, and the first sub-pixel SP1 absorbs a relatively large amount of red light and the second sub-pixel SP2 absorbs a relatively large amount of blue light.

A method of obtaining a brightness image and a color image by using the image sensor 20 according to an exemplary embodiment will be described below.

In this description, it is assumed that the first and second sub-pixels SP1 and SP2 of the unit pixel 30 respectively are a sub-pixel that absorbs red light (hereinafter, a R sub-pixel) and a sub-pixel that absorbs blue light (hereinafter, a B sub-pixel), and the third and fourth sub-pixels SP3 and SP4 are clear sub-pixels C that receive the incident light without filtering, that is, are sub-pixels that receive white light. When the first through fourth sub-pixels SP1 through SP4 of the unit pixel 30 are arranged as described above, the image sensor may be referred to as an RBCC image sensor.

FIG. 8 is a plan view symbolically showing an image measured when the image sensor according to an exemplary embodiment is an RBCC sensor.

In FIG. 8, "R" indicates a red light image region obtained through the R sub-pixel, and "B" indicates a blue light image region obtained through the B sub-pixel. Empty regions indicate white light image regions obtained through the third and fourth sub-pixels SP3 and SP4 which are clear sub-pixels.

The brightness image with respect to a measured image depicted in FIG. 8 may be obtained by using an interpolation method as bellow.

In detail, brightness at a given color sub-pixel, for example, the R sub-pixel and brightness at the B sub-pixel are calculated. An example configuration of the RBCC image sensor for calculating brightness at the R sub-pixel and brightness at the B sub-pixel is regarded as the image sensor depicted in FIG. 9. In FIG. 9, a color splitting element is omitted for convenience's sake. A brightness value at the given R sub-pixel, for example, an R sub-pixel 92 located in the center of the RBCC image sensor of FIG. 9 may be obtained as an average value of brightness values of six clear sub-pixels C1 through C6 around the R sub-pixel 92. Brightness values of other R sub-pixels may also be obtained as the same method described above. Also, a brightness value of the given B sub-pixel 94 may be obtained as an average value of brightness values of six clear sub-pixels C2, C3, C5, C6, C7, and C8 around the B sub-pixel 94. Brightness values of other B sub-pixels may also be obtained as the same method described above. As described above, when the brightness values of all pixels are calculated, a brightness image of a gray scale is obtained.

The brightness image may be obtained by using another method, such as an interpolation method that uses self-brightness values of the R sub-pixel and the B sub-pixel.

In detail, a brightness value at a given color sub-pixel, for example, the R sub-pixel 92 may be a weighted sum of an average value (hereinafter, A1) of brightness values at the six clear sub-pixels C1 through C6 adjacent to the R sub-pixels 92 around the R sub-pixel 92, a self-brightness value (hereinafter, A2) of the R sub-pixel 92, and brightness values (hereinafter, A3) of the R sub-pixels 92A through 92D adjacent to the R sub-pixel 92 around the R sub-pixel 92. A brightness value of another color sub-pixel, for example, the B sub-pixel 94 may also be a weighted sum calculated as the same method described above.

As an example, a brightness value at the R sub-pixel 92 may be calculated by the following formula.

$$\text{Brightness value at } R \text{ sub-pixel} = A1 \times a + A2 \times b + A3 \times c \quad \text{<Formula>}$$

where a, b, and c satisfy a+b+c=1.

In the above Formula, a, b, and c may be determined so that an image has optimum image quality, as an example, a=⅙, b=½, and c=–⅛.

Next, a method of obtaining a color image by using an interpolation method will be described.

As an example, a process of obtaining a red image will be described.

First, a value of red light at the B sub-pixel 94 may be obtained by interpolating values of red light of the R sub-pixels 92, 92A, 92C, 92D, 92E, and 92F adjacent to the B sub-pixel 94 around the B sub-pixel 94. Also, a value of red light at a given clear sub-pixel C3 may be obtained by interpolating values of red light of the R sub-pixels 92, 92A, 92C, and 92E adjacent to the clear sub-pixel C3 around the clear sub-pixel C3. In this manner, a red image may be obtained.

A blue image may also be obtained by the same method. In detail, a value of blue light at the R sub-pixel 92 may be obtained by interpolating values of blue light of the B sub-pixels 94, and 94A through 94E adjacent to the R sub-pixel 92 around the R sub-pixel 92. Also, a value of blue light at a given clear sub-pixel C2 may be obtained by interpolating values of blue light of the B sub-pixels 94 and 94A through 94C adjacent to the clear sub-pixel C2 around the clear sub-pixel C2. In this manner, a blue image may be obtained. In a color image, a remaining image besides the red and blue images is a green image, and thus, the green image may be calculated from the obtained red image and the blue image. In this manner, color information of the three colors may be obtained together with brightness information having high sensitivity by using the image sensor described above.

Figure 10:
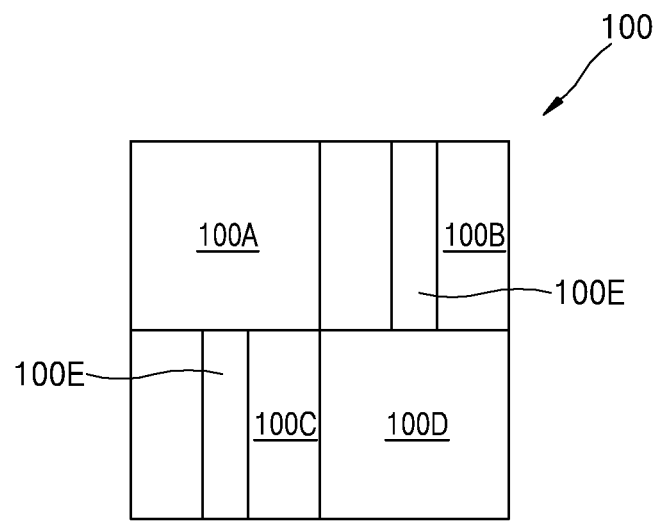
FIG. 10 is a plan view a unit pixel of an image sensor when the image sensor image sensor including a color splitting element according to an exemplary embodiment is an infrared sensor.

FIG. 10 shows a unit pixel 100 of an image sensor when the image sensor according to the current embodiment is used in an infrared region. That is, FIG. 10 shows the unit pixel 100 of the image sensor when the image sensor according to the current embodiment is an infrared image sensor.

Referring to FIG. 10, the unit pixel 100 is for sensing an infrared image, and includes first through fourth sub-pixels 100A through 100D. The first through fourth sub-pixels 100A through 100D may have the same optical characteristics with each other. The second and third sub-pixels 100B and 100C may be sub-pixels having the same optical characteristics with each other. Color splitting elements 100E are disposed in the second and third sub-pixels 100B and 100C. The modification with regards to the disposition and type of the color splitting element 100E may follow the modifications described with reference to FIGS. 1 through 5. The optical absorption characteristics of the first and fourth sub-pixels 100A and 100D in an infrared region may be different from that of the second and third sub-pixels 1008 and 100C, which will be described below.

As another exemplary embodiment, the first and second sub-pixels 100A and 100B of the unit pixel 100 may have the same optical characteristics with each other, and the third and fourth sub-pixels 100C and 100D may have the same optical characteristics with each other. The optical characteristics of the first and second sub-pixels 100A and 100B may be different from that of the third and fourth sub-pixels 100C and 100D. In this case, as depicted in FIG. 11, the color splitting element 100E may be disposed in the third and fourth sub-pixels 100C and 100D. In FIG. 11, the optical absorption characteristics of the first and fourth sub-pixels 100A and 100D in the infrared region may be different from that of the second and third sub-pixels 1008 and 100C.

Figure 11:
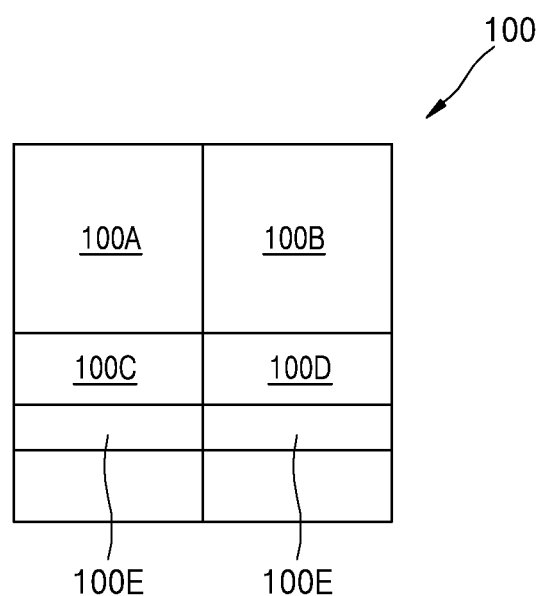
FIG. 11 is a plan view of a unit pixel of an image sensor when the image sensor including a color splitting element according to an exemplary embodiment is used in an infrared region.
Figure 12:
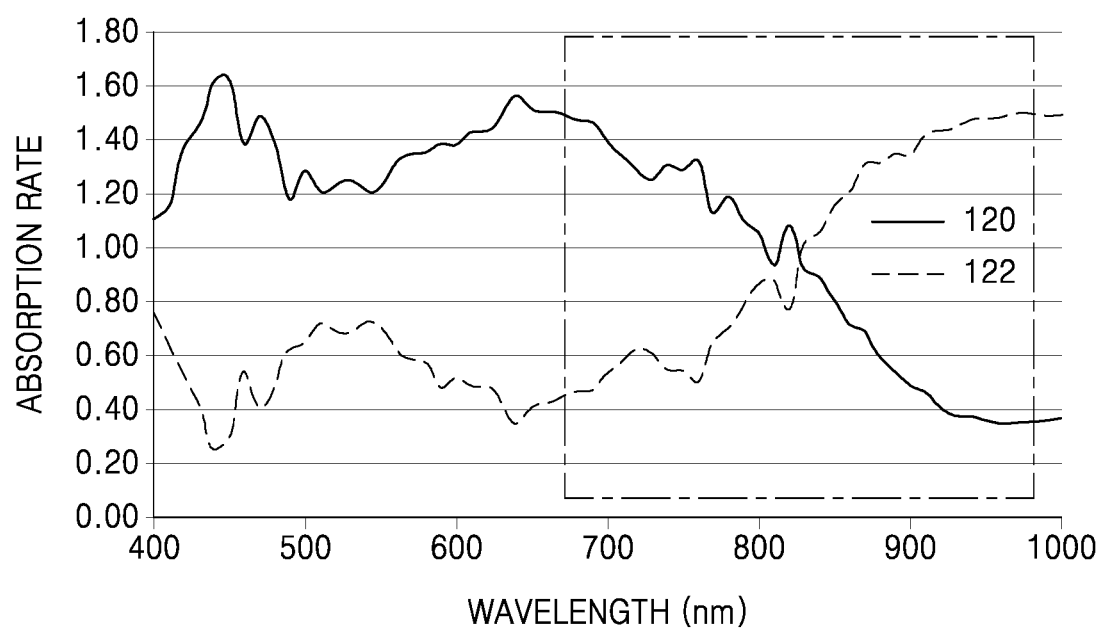
FIG. 12 is a graph showing an optical absorption spectrum of an image sensor with respect to an infrared region when the unit pixel of the image sensor including a color splitting element according to an exemplary embodiment is the same as the unit pixels depicted in FIGS. 10 and 11.

FIG. 12 is a graph showing an optical absorption spectrum of an image sensor with respect to an infrared region when the unit pixel 100 of the image sensor according to an exemplary embodiment is the same as the unit pixels 100 depicted in FIGS. 10 and 11.

In FIG. 12, a horizontal axis indicates a wavelength of light, and a vertical axis indicates optical absorption rate. In FIG. 12, a first graph 120 indicates a spectrum of light incident to the first and fourth sub-pixels 100A and 100D of FIG. 10 or the first and second sub-pixels 100A and 1008 of FIG. 11. A second graph 122 indicates a spectrum of light incident to second and third sub-pixels 1008 and 100C of FIG. 10 or the third and fourth sub-pixels 100C and 100D of FIG. 11.

Referring to the first and second graphs 120 and 122, it is seen that the image sensor has spectrum characteristics different from each other in an infrared region, for example, in a wavelength range from 650 nm to 1000 nm of incident light. In detail, in the case of the first and fourth sub-pixels 100A and 100D of FIG. 10 or the first and second sub-pixels 100A and 1008 of FIG. 11, in the infrared region, the optical absorption rate, that is, an infrared absorption rate is relatively high at a region where the wavelength is short (a short-wavelength region), and the optical absorption rate is relatively low at a region where the wavelength is long (a long-wavelength region) (the first graph 120). However, in the case of the second and third sub-pixels 100B and 100C of FIG. 10 to which the color splitting element 100E is disposed or the third and fourth sub-pixels 100C and 100D of FIG. 11 to which the color splitting element 100E is disposed, the optical absorption rate is low at a short-wavelength region of the infrared region, and the optical absorption rate is high at the long-wavelength region of the infrared region. This result may denote that two kinds of infrared images may be obtained when the unit pixels 100 of FIGS. 10 and 11 are used. In other words, an image sensor having the unit pixels 100 of FIGS. 10 and 11 may obtain an infrared image through two channels. In this way, an infrared image having a pseudo-color may be obtained by assigning a pseudo-color to each channel of the infrared image that is separately measured through two channels. Accordingly, visibility of the infrared image is increased when compared to a mono-chrome image. That is, a recognition rate of an object is increased.

FIGS. 13A-13D show various configuration examples of unit pixels of an image sensor and optical efficiencies according to the configurations.

Figures 13A, 13B, 13C:
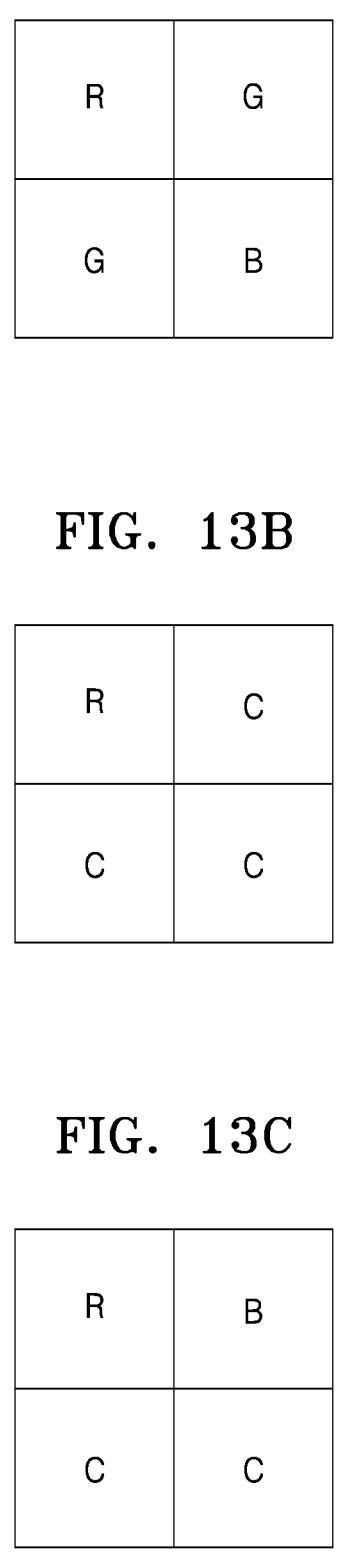

FIGS. 13A and 13B show unit pixels of an image sensor of the related art. In FIG. 13A, sub-pixels of the unit pixel form a bayer pattern, and, in FIG. 13B, the unit pixel includes one red sub-pixel and three clear sub-pixels, that is, the unit pixel of FIG. 13B is a red-clear sensor. In FIG. 13C, a unit pixel of an image sensor according to the current exemplary embodiment described above is shown, that is, the unit pixel is an RBCC sensor. In FIG. 13C, a color splitting element is omitted for convenience's sake.

Figure 13D:
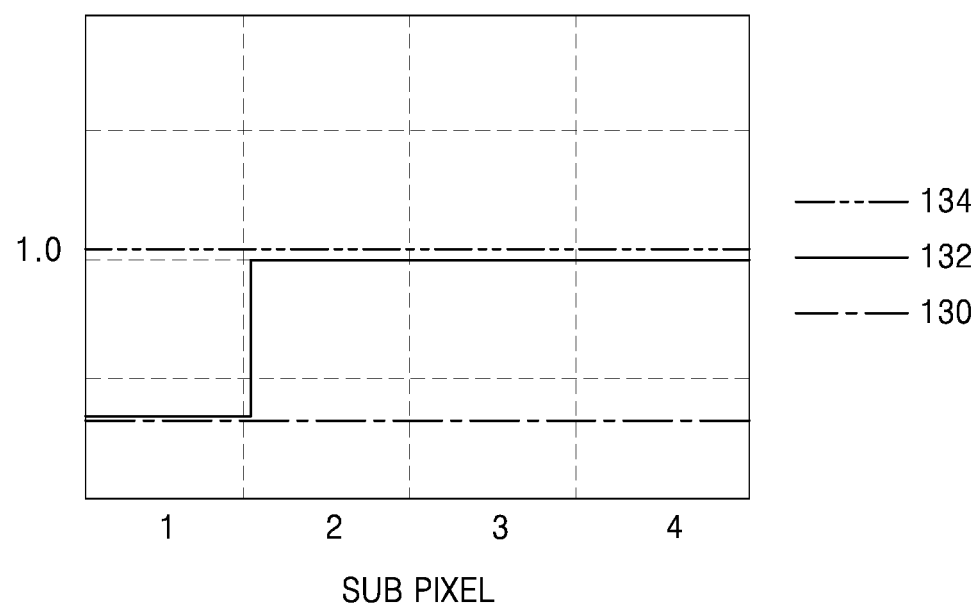

FIG. 13D shows optical efficiencies of the unit pixels depicted in FIGS. 13A and 13C. In FIG. 13D, a horizontal axis indicates four sub-pixels included in the unit pixel, and a vertical axis indicates optical efficiency.

In FIG. 13D, a first graph 130 indicates the optical efficiency of the unit pixel of FIG. 13A, a second graph 132 indicates the optical efficiency of the unit pixel of FIG. 13B, and a third graph 134 indicates the optical efficiency of the unit pixel of FIG. 13C.

Referring to the first through third graphs 130, 132, and 134 of FIG. 13D, it is seen that the optical efficiency of the unit pixel of FIG. 13B is higher than that of the unit pixel of FIG. 13A, and the optical efficiency of the unit pixel of FIG. 13C is higher than that of the unit pixel of FIG. 13B.

Also, in the case of the third graph 134, the optical efficiency of all sub-pixels of the unit pixel of FIG. 13C is constant as 1.0. This is because the color splitting element includes a material that does not nearly absorb light, and thus, energy of incident light may be substantially maintained as it is when compared to the unit pixel of FIG. 13A.

In this manner, in the case of an image sensor according to an exemplary embodiment, the image sensor may maintain the same sensitivity as in a red-clear sensor of the related art while providing color information with respect to an object. Accordingly, when the image sensor according to an exemplary embodiment is used, a low luminance characteristic may be improved.

The unit pixel of the image sensor includes two color sub-pixels different from each other and two clear sub-pixels, and thus, the unit pixel may provide a large number of color information than an image sensor of the related art. Also, a color splitting element is disposed on at least one region of regions where the two color sub-pixels are located. Accordingly, an amount of light entering the two color sub-pixels is increased compared to when there is no color splitting element, and thus, sensitivity with respect to an object may be increased.

As a result, when an image sensor according to an exemplary embodiment is used, a recognition rate with respect to an object may be increased even at a low luminance environment, and also, visibility with respect to the object may further be increased by adding color information to the recognition rate.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image sensor comprising:
   a plurality of clear sub-pixel rows comprising a plurality of clear sub-pixels; and
   a plurality of color sub-pixel rows that comprise a plurality of color sub-pixels, and are disposed alternately with the plurality of clear sub-pixels rows,
   wherein the plurality of color sub-pixels comprise first color sub-pixels and second color sub-pixels that are alternately disposed with each other, and each of the first color sub-pixels comprises a first color splitting element.

2. The image sensor of claim 1, wherein the first color sub-pixels are blue color sub-pixels.

3. The image sensor of claim 1, wherein the second color sub-pixels are red color sub-pixels.

4. The image sensor of claim 1, wherein the first color sub-pixels are blue color sub-pixels and the second color sub-pixels are red color sub-pixels.

5. The image sensor of claim 1, further comprising a visible light blocking filter.

6. The image sensor of claim 4, wherein the first and the second color sub-pixels have a relatively high optical absorption rate with respect to light in an infrared wavelength band, compared to light having a wavelength outside the infrared wavelength band.

7. The image sensor of claim 4, wherein the first color sub-pixels absorb an infrared ray in a first wavelength band, and the second color sub-pixels absorb an infrared ray in a second wavelength band that is less than the first wavelength band.

8. The image sensor of claim 1, wherein each of the second color sub-pixels comprises a second color splitting element.

9. The image sensor of claim 1, wherein the first color splitting element is disposed in a diagonal direction in at least one of the first color sub-pixel.

10. The image sensor of claim 1, wherein the first color splitting element has a refractive index greater than a refractive index of a material surrounding the first color splitting element.

11. An image sensor comprising:
    a plurality of unit pixels,
    wherein each of the plurality of unit pixels comprises two color sub-pixels and two clear sub-pixels, and
    wherein only one of the two color sub-pixels comprises a first color splitting element.

* * * * *